US010231008B2

United States Patent
Møller et al.

(10) Patent No.: US 10,231,008 B2
(45) Date of Patent: Mar. 12, 2019

(54) SELF-ORGANIZING AUDIO SYNCHRONIZATION

(71) Applicant: Dynastrom ApS, Tilst (DK)

(72) Inventors: Brian Thoft Moth Møller, Aalborg SV (DK); Paul Fleischer, Aarhus V (DK); Bjørn Reese, Aarhus V (DK)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 15/547,093

(22) PCT Filed: Jan. 27, 2016

(86) PCT No.: PCT/DK2016/050021
§ 371 (c)(1),
(2) Date: Jul. 28, 2017

(87) PCT Pub. No.: WO2016/119792
PCT Pub. Date: Aug. 4, 2016

(65) Prior Publication Data
US 2018/0020253 A1 Jan. 18, 2018

(30) Foreign Application Priority Data

Jan. 28, 2015 (DK) .................................. 2015 70048

(51) Int. Cl.
*H04R 3/12* (2006.01)
*H04N 21/43* (2011.01)
(Continued)

(52) U.S. Cl.
CPC ......... *H04N 21/4307* (2013.01); *G06F 3/165* (2013.01); *H04L 65/1066* (2013.01);
(Continued)

(58) Field of Classification Search
CPC .... H04N 21/436; H04N 21/41; H04N 21/442; H04W 84/20; H04W 56/00;
(Continued)

(56) References Cited

U.S. PATENT DOCUMENTS 6,192,397 B1 2/2001 Thompson
6,598,172 B1 7/2003 VanDeusen et al.
(Continued)

FOREIGN PATENT DOCUMENTS

WO WO 2006/053704 A1 5/2006
WO WO 2012/018300 A2 2/2012
WO WO 2013/164792 A1 12/2013

OTHER PUBLICATIONS

Wei Yen et al: "On the synchronization mechanisms for multimedia integrated services networks", Nov. 13, 1994 (Nov. 13, 1994), Multimedia Transport and Teleservices. International Cost 237 Workshop Proceedings. Vienna, Nov. 13-15, 1994; [International Proceedings], Berlin, Springer, DE, pp. 168-184, XP 01919.*
(Continued)

*Primary Examiner* — Melur Ramakrishnaiah
(74) *Attorney, Agent, or Firm* — Sterne, Kessler, Goldstein & Fox P.L.L.C.

(57) ABSTRACT

The invention provides a protocol and a method for a plurality of separate devices to stream audio and/or video in a synchronized manner in a computer network. One device is session leader and controls synchronization of the streaming of the other devices. If the session leader device is switched off, or becomes otherwise unavailable, local election algorithms on the other devices serve to automatically elect a new session leader to synchronize to in an autonomous manner, e.g. based on a random number election based algorithm. In this manner, a self-organizing synchronization network is provided.

20 Claims, 2 Drawing Sheets

(51) Int. Cl.
*H04N 21/41* (2011.01)
*H04N 21/436* (2011.01)
*H04N 21/442* (2011.01)
*H04W 84/20* (2009.01)
*G06F 3/16* (2006.01)
*H04L 29/06* (2006.01)
*H04R 27/00* (2006.01)

(52) U.S. Cl.
CPC ....... *H04L 65/403* (2013.01); *H04N 21/4126* (2013.01); *H04N 21/43615* (2013.01); *H04N 21/44227* (2013.01); *H04R 3/12* (2013.01); *H04R 27/00* (2013.01); *H04W 84/20* (2013.01); *H04R 2227/005* (2013.01); *H04R 2420/07* (2013.01)

(58) Field of Classification Search
CPC ... H04L 65/4076; H04L 65/602; H04L 65/80; H04M 1/7253; H04M 1/72558; H04M 2250/64
USPC ................................ 700/94; 455/418, 556.1
See application file for complete search history.

(56) References Cited

U.S. PATENT DOCUMENTS

| | | |
|---|---|---|
| 2005/0272455 A1* | 12/2005 | Oommen ................ H04W 4/08 455/518 |
| 2006/0156375 A1 | 7/2006 | Konetski |
| 2006/0161835 A1 | 7/2006 | Panabaker et al. |
| 2006/0270395 A1* | 11/2006 | Dhawan .............. H04M 1/7253 455/418 |
| 2014/0181270 A1 | 6/2014 | Millington |
| 2014/0269776 A1 | 9/2014 | Bomfim et al. |

OTHER PUBLICATIONS

International Search Report issued in related application dated Apr. 21, 2016.
Written Opnion issued in related application dated Apr. 21, 2016.
Yen et al.; On the Synchronization Mechanisms for Multimedia Integrated Services Networks; School of Electrical and Computer Engineering; Georgia Institute of Technology, Atlanta, GA; Nov. 13, 1994, pp. 168-184.

* cited by examiner

SELF-ORGANIZING AUDIO SYNCHRONIZATION

FIELD OF THE INVENTION

The present invention relates to the field of synchronized playback of audio or video between devices in a peer-to-peer computer network system, e.g. in a wi-fi network.

BACKGROUND OF THE INVENTION

In synchronized playback of audio or video between a plurality of devices in a peer-to-peer computer network system, the devices can participate in coordinated sessions, where the participating devices can play synchronously. The participating devices can be located within or across several rooms.

In order to play synchronously, the participating devices need to agree on the playback time and pace. This is done by electing one of the devices as a provisional leader, and the other devices will adjust their playback timing to that of the leader.

SUMMARY OF THE INVENTION

Thus, according to the above description, it is an object of the present invention to provide an efficient way of self-organizing a network of synchronized playback devices.

In a first aspect, the invention provides a method for electing a session leader in a network of a plurality of separate devices in a computer network session for playback of audio and/or video from a source in a synchronized manner, see appended claim 1.

According to this invention, multiple devices can play the same audio or video experience in a synchronized manner. A provisional leader is elected to provide the frame of reference that the participating devices use to synchronize their individual playback. By means of a local election algorithm which is common for all separate devices taking part in the session, an efficient way of providing a self-organizing synchronization is obtained, since the session can continue in spite of the current session leader being moved away, or switched off. A new session leader will automatically be elected.

When a session leader disappears, a new leader is elected among the remaining participants in the session. The election is done using a leader election process involving a leader election algorithm which is present locally on each of the separate devices. This means that the single device in the session can easily determine which one is the new session leader with a minimum of negotiation communication between the remaining devices. Thereby, only a minimum of time passes without a synchronization leader. This ensures that one device always provides a common frame of reference for the playback timing that the other devices can synchronize with.

If the current leader disappears, then a new provisional leader is elected among the remaining participants. This reappointment happens with negligible impact on synchronization, and minimal loss in playback if the leader is also responsible for recasting the audio or video stream to the participating devices.

One example is a situation where the device that has been elected leader is responsible for not only setting the pace, but also for recasting the music stream from an Internet music service provider to the participating devices. If this leader disappears, the system temporarily loses its ability to receive the music stream and to direct the playback timing. In this situation the invention ensures the re-election of a new speaker that takes over the music stream from the music streaming service and enables the synchronization for the remaining participating devices.

This invention enables use cases where music is moved from device to device, and where devices play the same music without being dependent on the availability of the current session leader.

This invention makes playback sessions more fault-tolerant, and make them less prone to drop-outs or degradation of synchronization in audio playback.

In the dependent claims 2-9, a number of embodiments and/or preferred features will be defined.

In a second aspect, the invention provides a protocol for controlling a plurality of separate devices in a computer network, see appended claim 10.

In a third aspect, the invention provides a computer executable program code, or a programmable- or fixed hardware, and/or combination hereof, arranged to perform the method according to the first aspect, or causes a device with a processor to function according to the protocol of the second aspect. The computer executable program code may be stored on a data carrier. The program code may be implemented to function on any type of processor platform.

In a fourth aspect, the invention provides a device that operates according to the method or protocol of the first or second aspect. Especially, the device may be an audio device, such as a stand alone active loudspeaker. The device may also be any other type of device with audio and/or video capabilities, e.g. a TV set.

In a fifth aspect, the invention provides a system of a plurality of devices according to the fourth aspect, e.g. mixed types of devices arranged to take part in a computer network session, e.g. a wi-fi network session, of synchronized playback of audio and/or video content.

In a sixth aspect, the invention provides an electronic chip programmed to allow a device to operate according to protocol according to the third aspect, if provided with access to the electronic chip, e.g. if the device has the chip installed therein.

It is appreciated that the same advantages and embodiments described for the first aspect apply as well for the second, third, and fourth aspects. Further, it is appreciated that the described embodiments can be intermixed in any way between all the mentioned aspects.

BRIEF DESCRIPTION OF THE FIGURES

The invention will now be described in more detail with regard to the accompanying figures of which

The figures illustrate specific ways of implementing the present invention and are not to be construed as being limiting to other possible embodiments falling within the scope of the attached claim set.

DETAILED DESCRIPTION OF THE INVENTION

Figure 1:
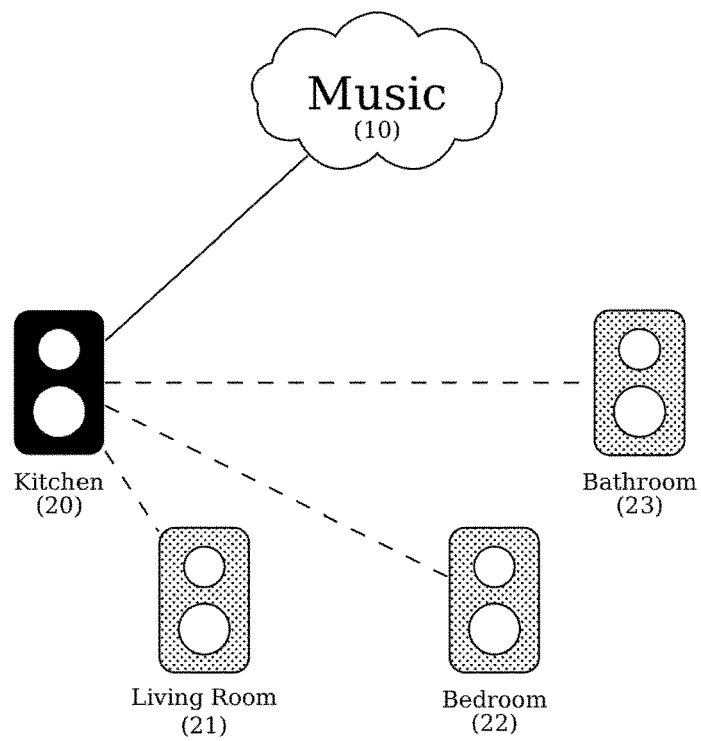
FIG. 1 shows a situation where four loudspeaker devices (20-23) connected to the same playback session, with the Kitchen loudspeaker (20) acting as session leader. The Kitchen loudspeaker (20) is connected to a music source (10).

FIG. 1 shows a situation where four loudspeaker devices (20-23) connected to the same playback session, with the Kitchen loudspeaker (20) acting as session leader. The Kitchen loudspeaker (20) is connected to a music source (10).

Figure 2:
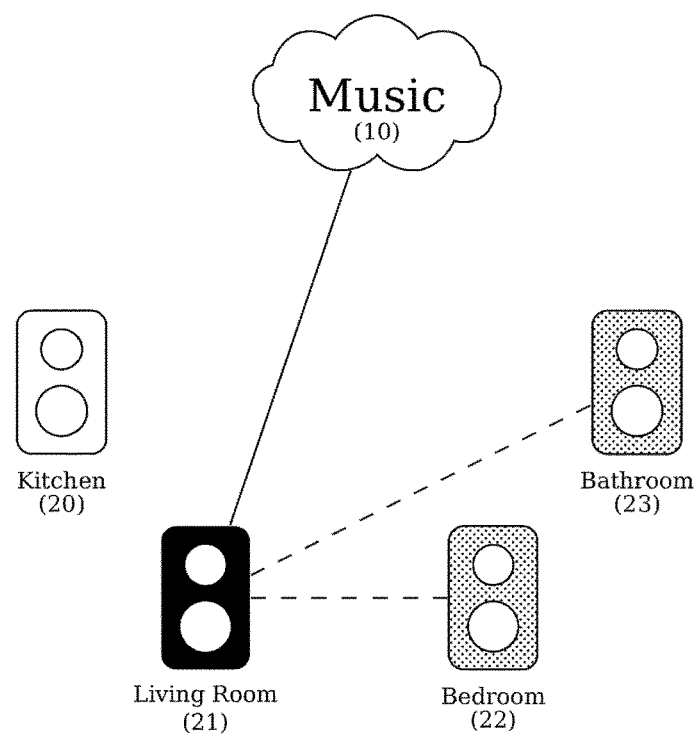
FIG. 2 shows the setup of FIG. 1, but where the Kitchen loudspeaker (20) has been turned off, and the Living Room loudspeaker (21) has been elected as the new session leader, and created a new connection to the music source (10)

FIG. 2 shows the setup of FIG. 1, but where the Kitchen loudspeaker (20) has been turned off, and the Living Room loudspeaker (21) has been elected as the new session leader, and created a new connection to the music source (10).

When a playback is started on a device it creates a new session. This session is announced to other devices, which may then choose to join the session. All devices in the same session will play the same music in a synchronized manner. Devices may join and leave the session at any time. The session is terminated when there are no participants left.

Each session will have a leader who acts as the authoritative source of synchronization for the given session. Each participant will use the synchronization information to adjust their playback timing to that of the leader in order to achieve a synchronized playback. Each participant decides what level of synchronization quality it must achieve.

The synchronization information can be pushed from the leader to the participants, or be pulled independently from the leader by the individual participants. Each participant can query the leader at its own polling frequency. The polling frequency may change during playback. A newly joined participant has the need for polling more frequently to reach a high level of synchronization quality quickly, whereas a participant that has been joined for a while and therefore has reached a high level of synchronization quality can lower its polling frequency and instead rely on frequency adjustments to account for drifting.

For this scheme to work, it is crucial that there is a leader for each ongoing session. A provisional leader is elected among the participating devices by a leader election algorithm. If this provisional leader disappears, then a new leader will be elected among the remaining participants. This gives the system a fail-over mechanism that ensures that there is always a leader for a session as long as the session exists.

Devices may leave a session for numerous reasons. For instance, the user turns the device off or switches it to standby mode, the user instructs the device to join another playback session, the device may lose network connectivity to the network, or the device may become incapacitated for other reasons that are familiar to those skilled in the art. These conditions can be detected by the other devices in different ways, but each of those will be turned into a local leave-session event, which will trigger a re-election if the existing leader leaves the session.

There can be multiple independent sessions in the network, each with its own session leader. This enables different family members can play different music in different rooms without interfering with each other. They also have the option to join another ongoing session, or move a session from one room to another.

The provisional leader may take on additional responsibilities, and we will exemplify two of them here. One responsibility is to ensure that remote control commands are executed synchronously on all participating devices; for instance, seek, pause or resume is invoked simultaneously on all devices in a session.

Another responsibility is to recast the music stream from an Internet music service provider to the participating devices. Recasting may be needed to reduce the load on the Internet music service provider, or to address content delivery restrictions that precludes multiple devices from streaming directly from the Internet music service provider. A change of leadership will also pass these additional responsibilities to the new leader.

Although the leader can recast the stream, the synchronization and streaming are independent if the streaming includes an indication of the stream position, so different streaming topologies and streaming mechanisms are possible.

A variation of the leader fail-over, is to elect both a leader and a deputy in advance. The deputy will become the leader if the existing leader disappears, and afterwards a new deputy is elected among the remaining non-leader participants. This enables the system to do a fast fail-over. For instance, the deputy may establish a connection to an Internet music service provider in advance, so fail-over can be done in a timely fashion.

An example of a leader election algorithm is to have all participants select a uniformly distributed random number, and the winner is the one with the highest number. This analogous to rolling a die with many sides. When a device decides to start an election it sends its own random number to the other participating devices, who in turn will generate their own and share it with all other participants. Upon reception of the random number from all participants, the participant with the highest random number will declare itself as the leader. Ties are handled by a triggering a re-election.

Figure 3:
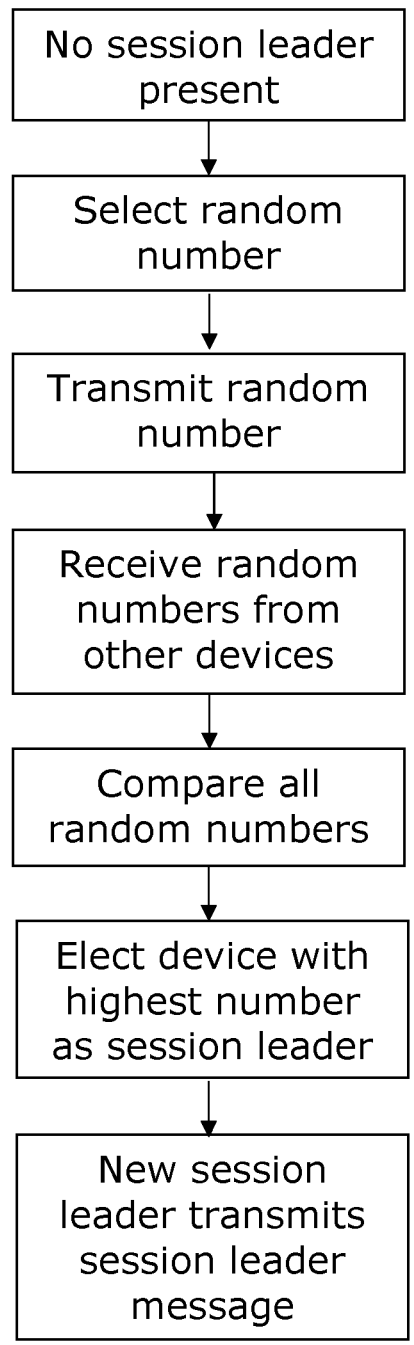
FIG. 3 illustrates steps of a leader election algorithm embodiment.

FIG. 3 shows an example of steps of a leader election algorithm corresponding to "the new session leader is the device which after throwing a die is the device with the highest number of eyes". In practice a predetermined number interval is selected, and the device with the highest random number selected in this interval is the new session leader. Thus only the random number selected by other devices needs to be transmitted, then the other devices can determine which one is the new session leader. Such algorithm is simple and easy to implement, and it is fast to execute even in a network of several device, since each single device can easily determine which device is the new session leader. By sending a confirmation message, the new session leader may ensure that other devices in the network session agrees which one to now synchronize to.

To sum up: the invention provides a protocol and a method for a plurality of separate devices to stream audio and/or video in a synchronized manner in a computer network. One device is session leader and controls synchronization of the streaming of the other devices. If the session leader device is switched off, or becomes otherwise unavailable, local election algorithms on the other devices serve to automatically elect a new session leader to synchronize to in an autonomous manner, e.g. based on a random number election based algorithm. In this manner, a self-organizing synchronization network is provided.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for electing a session leader in a computer network of a plurality of separate devices in a computer network session for playback of audio and/or video from a source in a synchronized manner, wherein the session leader is one of the plurality of separate devices, wherein each of the plurality of separate devices in the computer network session are programmed to:
   join the computer network session;
   announce the computer network session to the plurality of separate devices; and
   detect that the session leader of the computer network session is not present;
   based on detecting that the session leader is not present:
      participate in an election to elect a new session leader among the plurality of separate devices present in the computer network session according to a predetermined leader election algorithm; and
      take a role as the session leader based on the predetermined leader election algorithm;
   transmit synchronization information to a first device of the plurality of separate devices at a first polling frequency; and
   transmit the synchronization information to a second device of the plurality of separate devices at a second polling frequency, wherein the second polling frequency is different from the first polling frequency.

2. The method according to claim 1, wherein said leader election algorithm comprises:
   selecting a random number in a preselected number interval,
   transmitting the random number to the plurality of separate devices present in the computer network session,
   receiving random numbers selected by the plurality of separate devices present in the computer network session,
   electing the new session leader in response to a result of processing the selected random number and the received random numbers according to a predetermined selection criterion.

3. The method according to claim 2, wherein said leader election algorithm comprises electing the new session leader based on a separate device of the plurality of separate devices having the highest random number.

4. The method according to claim 2, wherein, after taking the role of the session leader, the session leader identifies itself to the other separate devices in the computer network session.

5. The method according to claim 1, wherein based on taking the role of the session leader, each of the plurality of separate devices in the computer network session are further programmed to:
   control streaming of audio and/or video data from the source, wherein the source comprises at least one of a smartphone or a server streaming the audio and/or video to the session leader.

6. The method according to claim 1, wherein based on taking the role of the session leader, each of the plurality of separate devices in the computer network session are further programmed to:
   a stream the audio and/or video from the source to the plurality of separate devices in the computer network session.

7. The method according to claim 1, wherein at least one of the plurality of separate devices comprises a loudspeaker configured to playback audio of the audio and/or video from the source streamed to the at least one of the plurality of separate devices in the computer network session synchronized based on the synchronization information.

8. The method according to claim 1, wherein at least one of the plurality of separate devices comprises a display configured to display video of the audio and/or video from the source streamed to the at least one of the plurality of separate devices in the computer network session synchronized based on the synchronization information.

9. The method according to claim 1, wherein the computer network is a wireless computer network.

10. The method according to claim 1, wherein said leader election algorithm comprises electing the separate device with the lowest random number the new session leader.

11. The method according to claim 1; wherein the first polling frequency is based on a first duration of time in which the first device has joined the computer network session and second polling frequency is based on a second duration of time in which the second device has joined the computer network session.

12. The method according to claim 11, wherein each of the plurality of separate devices in the computer network session are further programmed to:
   configure the first polling frequency while the first device is joined to the computer network session; and
   configure the second polling frequency while the second device is joined to the computer network session.

13. The method according to claim 1, wherein based on taking the role of the session leader, each of the plurality of separate devices in the computer network session are further programmed to:
   receive a remote control command for controlling the computer network session; and
   synchronize execution of the remote control command by the plurality of separate devices in the computer network session.

14. A non-transitory, computer-readable device having instructions stored thereon that, when executed by a device, cause the device to perform operations comprising:
   joining a computer network session comprising a plurality of separate devices;
   announcing the computer network session to the plurality of separate devices; and
   detecting that a session leader of the computer network session is not present;
   based on detecting that the session leader is not present:
      participating in an election to elect, for the computer network session, a session leader among the plurality of separate devices in the computer network session according to a predetermined leader election algorithm; and
      taking a role as the session leader based on the predetermined leader election algorithm;
      receiving a first request for synchronization information from a first device of the plurality of separate devices at a first polling frequency; and receiving a second request the synchronization information from a second device of the plurality of separate devices at a second polling frequency, wherein the second polling frequency is different from the first polling frequency.

15. The non-transitory, tangible computer-readable device according to claim 14, wherein said leader election algorithm comprises electing the new session leader as the separate device with the lowest random number.

16. The non-transitory, tangible computer-readable device according to claim 14, wherein the first polling frequency is based on a first duration of time in which the first device has joined the computer network session and second polling frequency is based on a second duration of time in which the second device has joined the computer network session.

17. A device comprising a processor and a network interface arranged to receive audio and/or video via a computer network session for playback of audio and/or video from a source in a synchronized manner from a source in a synchronized manner in response to synchronization information from a session leader, wherein the processor is programmed to perform operations, the operations comprising:

joining the computer network session comprising a plurality of separate devices;

announcing the computer network session to the plurality of separate devices; and detecting that the session leader of the computer network session is not present;

based on detecting that the session leader is not present:

participating in an election to elect, for the computer network session, the session leader among the plurality of separate devices present in the computer network session according to a predetermined leader election algorithm; and taking a role as the session leader based on the predetermined leader election algorithm;

transmitting synchronization information to a first device of the plurality of separate devices at a first polling frequency; and transmitting the synchronization information to a second device of the plurality of separate devices at a second polling frequency wherein the second polling frequency is different from the first polling frequency.

18. The device according to claim 17, wherein said leader election algorithm comprises electing the separate device with the lowest random number as the session leader.

19. The device according to claim 17, wherein said leader election algorithm comprises electing the separate device with the lowest random number the new session leader.

20. The device according to claim 17, wherein the first polling frequency is based on a first duration of time in which the first device has joined the computer network session and second polling frequency is based on a second duration of time in which the second device has joined the computer network session.

* * * * *